(12) United States Patent
Mizuno

(10) Patent No.: US 10,771,761 B2
(45) Date of Patent: Sep. 8, 2020

(54) INFORMATION PROCESSING APPARATUS, INFORMATION PROCESSING METHOD AND STORING UNIT

(71) Applicant: CANON KABUSHIKI KAISHA, Tokyo (JP)

(72) Inventor: Shogo Mizuno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/214,685

(22) Filed: Dec. 10, 2018

(65) Prior Publication Data

US 2019/0182470 A1    Jun. 13, 2019

(30) Foreign Application Priority Data

Dec. 12, 2017 (JP) .................................. 2017-237668

(51) Int. Cl.
| | |
|---|---|
| *H04N 13/117* | (2018.01) |
| *G06T 1/00* | (2006.01) |
| *G06T 15/20* | (2011.01) |
| *G06T 17/00* | (2006.01) |

(52) U.S. Cl.
CPC ......... *H04N 13/117* (2018.05); *G06T 1/0007* (2013.01); *G06T 15/20* (2013.01); *G06T 15/205* (2013.01); *G06T 17/00* (2013.01)

(58) Field of Classification Search
None
See application file for complete search history.

(56) References Cited

U.S. PATENT DOCUMENTS

| | | | | |
|---|---|---|---|---|
| 6,417,850 B1* | 7/2002 | Kang | ..................... | G06T 15/205 345/422 |
| 7,161,616 B1* | 1/2007 | Okamoto | .................. | B60R 1/00 348/148 |
| 2010/0158482 A1* | 6/2010 | Sikora | .................... | G06T 15/205 386/241 |

(Continued)

FOREIGN PATENT DOCUMENTS

JP    2008-015756 A    1/2008

OTHER PUBLICATIONS

Noah Snavely, Steven M. Seitz, Richard Szeliski, "Modeling the World from Internet Photo Collections", Dec. 11, 2007, Springer, International Journal of Computer Vision, vol. 80, pp. 189-210.*

(Continued)

*Primary Examiner* — Robert Bader
(74) *Attorney, Agent, or Firm* — Venable LLP

(57) ABSTRACT

An information processing apparatus includes one or more memories storing instructions, and one or more processors executing the instructions to determine, among a plurality of captured images obtained by a plurality of image capturing apparatuses, a display target image related to a virtual viewpoint image, based on a position of a virtual viewpoint and a view direction from the virtual viewpoint, the virtual viewpoint image being generated based on the display target image and the position of the virtual viewpoint and the view direction from the virtual viewpoint, and to cause a displaying unit to display the determined display target image in a displaying mode according to a degree of contribution of the determined display target image to generation of the virtual viewpoint image.

14 Claims, 11 Drawing Sheets

(56) References Cited

U.S. PATENT DOCUMENTS

2012/0169770 A1* 7/2012 Snavely ............. G06K 9/00637
  345/629
2018/0174357 A1* 6/2018 Priest .................... G06T 15/205

OTHER PUBLICATIONS

Luca Ballan, Gabriel J. Brostow, Jens Puwein, Marc Pollefeys, "Unstructured Video-Based Rendering: Interactive Exploration of Casually Captured Videos", Jul. 2010, ACM, ACM Transactions on Graphics, vol. 29, No. 4, Article 87.*

C. Lipski, C. Linz, K. Berger, A. Sellent, M. Magnor, "Virtual Video Camera: Image-Based Viewpoint Navigation Through Space and Time", 2010, Blackwell Publishing, Computer Graphics Forum, vol. 29, No. 8, pp. 2555-2568.*

* cited by examiner

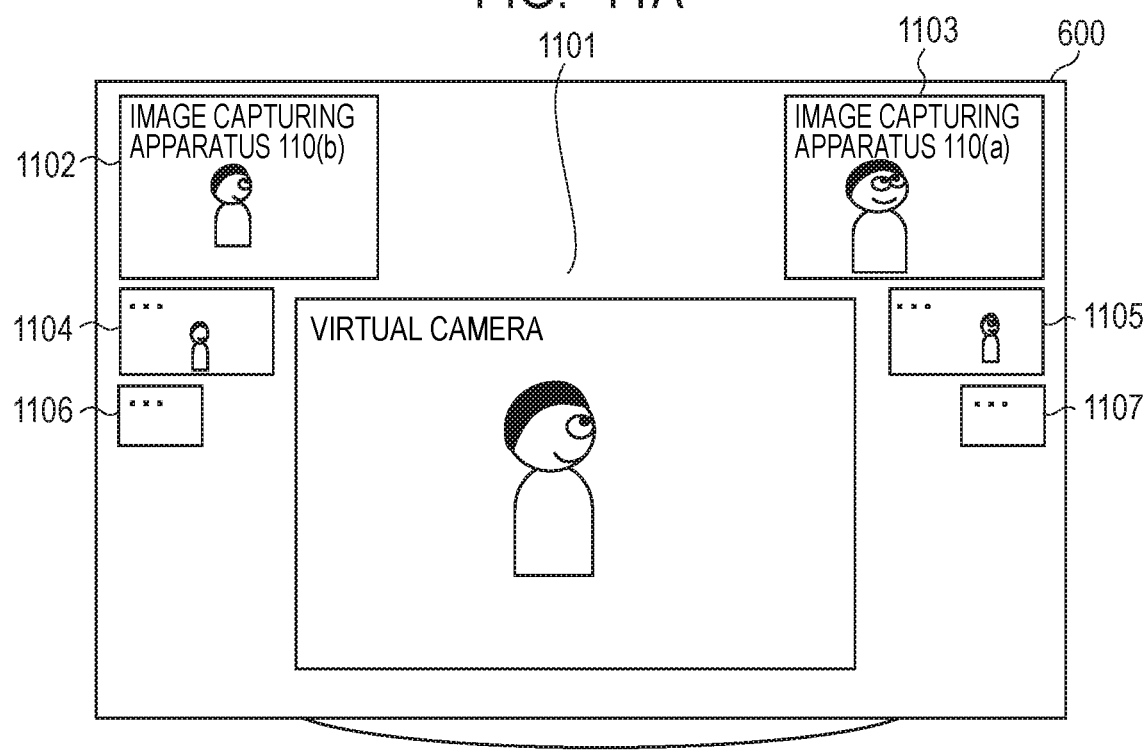
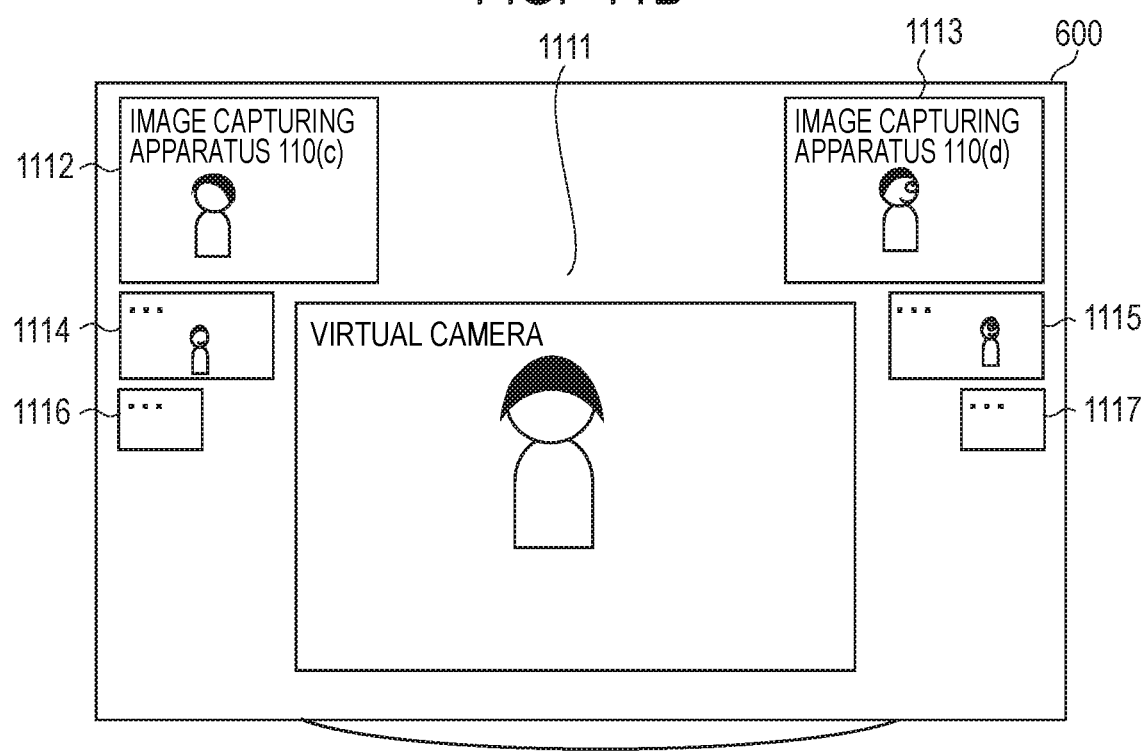

INFORMATION PROCESSING APPARATUS, INFORMATION PROCESSING METHOD AND STORING UNIT

BACKGROUND OF THE INVENTION

This application claims the benefit of Japanese Patent Application No. 2017-237668, filed Dec. 12, 2017, which is hereby incorporated by reference in its entirety.

FIELD OF THE INVENTION

The present invention relates to an information processing apparatus, an information processing method, and a storing unit.

DESCRIPTION OF THE RELATED ART

In recent years, there is a technique of disposing a plurality of image capturing apparatuses such as cameras, or the like, respectively, at different positions, performing capturing (photographing) synchronously from a plurality of viewpoints, and, by using images from a plurality of viewpoints obtained by the capturing, generating a virtual viewpoint image being an image from an arbitrary viewpoint.

The generation of the virtual viewpoint image based on the images from the plurality of viewpoints can be realized by, for example, aggregating the images captured by the plurality of image capturing apparatuses in an image processing unit such as a server or the like and performing a process such as rendering or the like based on a virtual viewpoint.

By the virtual viewpoint image like this, for example, it is possible to produce contents of a powerful viewpoint from images captured in a soccer or basketball game, or it is possible for a user oneself who is viewing the contents to watch the game while freely moving his/her viewpoint.

Japanese Patent Application Laid-Open No. 2008-15756 discloses a technique of generating and displaying a virtual viewpoint image by using images of a subject captured by a plurality of cameras disposed so as to surround the subject.

The virtual viewpoint image is generated by using the images synchronously captured by the plurality of image capturing apparatuses. Therefore, if an abnormality occurs in the image captured by a part of the image capturing apparatuses, a quality of the virtual viewpoint image may be deteriorated. For example, in a case when capturing is performed under a state that an exposure of one image capturing apparatus is different from those of other image capturing apparatuses, a color tint of the subject may be incorrect when the subject is viewed from a specific virtual viewpoint. Besides, in a case when an unexpected subject (obstacle such as a spectator, a cheering flag, or the like) is captured by the camera and thus, a part of a capturing-target subject is hidden, an image in which there is no part (a hand, a leg, or the like) of the subject (e.g., a player, or the like) may be obtained if it is viewed from a specific virtual viewpoint. In such a case, there was a demand to enable a user to more easily grasp a cause of a deterioration of quality of the virtual viewpoint image. However, in such a conventional art, it was not possible for the user to grasp the cause of the deterioration of quality of the virtual viewpoint image more easily.

SUMMARY OF THE INVENTION

The present invention provides an information processing apparatus for causing a displaying unit to display an image related to a virtual viewpoint image generated based on a plurality of captured images obtained by capturing a capturing area with a plurality of cameras and on a position and a direction of a virtual viewpoint, the information processing apparatus comprising a determining unit configured to determine, among the captured images obtained by the plurality of cameras, a display target image being an image to be displayed, based on virtual viewpoint information representing the position and direction of the virtual viewpoint, and a display controlling unit configured to cause the displaying unit to display the display target image determined by the determining unit.

According to the present invention, it is possible for a user to more easily grasp a cause of a deterioration of quality of a virtual viewpoint image.

Further features of the present invention will become apparent from the following description of exemplary embodiments with reference to the attached drawings.

BRIEF DESCRIPTION OF THE DRAWINGS

FIGS. 11A and 11B are diagrams for describing examples of display states of display images.

DESCRIPTION OF THE EMBODIMENTS

Hereafter, preferred embodiments of the present invention will be described with reference to the attached drawings.

First Embodiment

Figure 1:
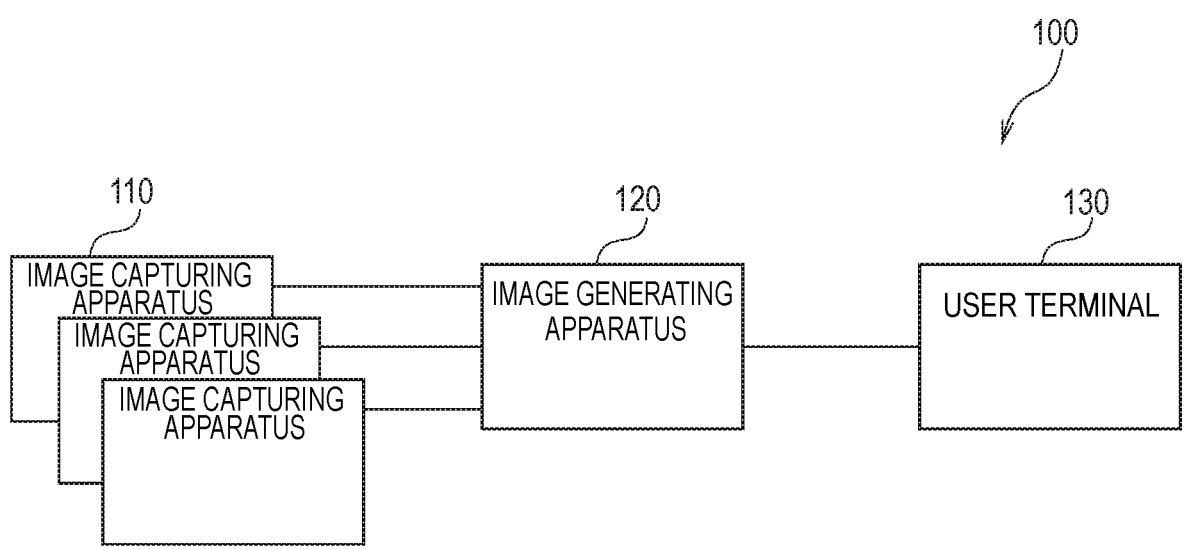
FIG. 1 is a diagram for describing an example of a system configuration of an image processing system.

FIG. 1 is a diagram for describing an example of a system configuration of an image processing system 100.

The image processing system 100 includes two or more image capturing apparatuses 110, an image generating apparatus 120, and a user terminal 130. Each of the plurality of image capturing apparatuses 110 and the image generating apparatus 120 are connected to each other so as to mutually communicate with each other via a network such as a LAN (local area network), the Internet, the Ethernet™, or the like. Besides, the image generating apparatus 120 and the user terminal 130 are connected to each other so as to mutually communicate with each other via a network such as a LAN, the Internet, the Ethernet, or the like.

Each of the image capturing apparatuses 110 is an image capturing apparatus such as a network camera, a digital camera, or the like, which can capture images such as a still image, a moving image, and the like. The image capturing apparatuses 110 are disposed so as to surround a capturing target such as a soccer stadium, another stadium, a concert venue, a specific subject, or the like. Each of the image capturing apparatuses 110 transmits an image obtained by capturing to the image generating apparatus 120 via a network by wire or wireless.

Figure 2:
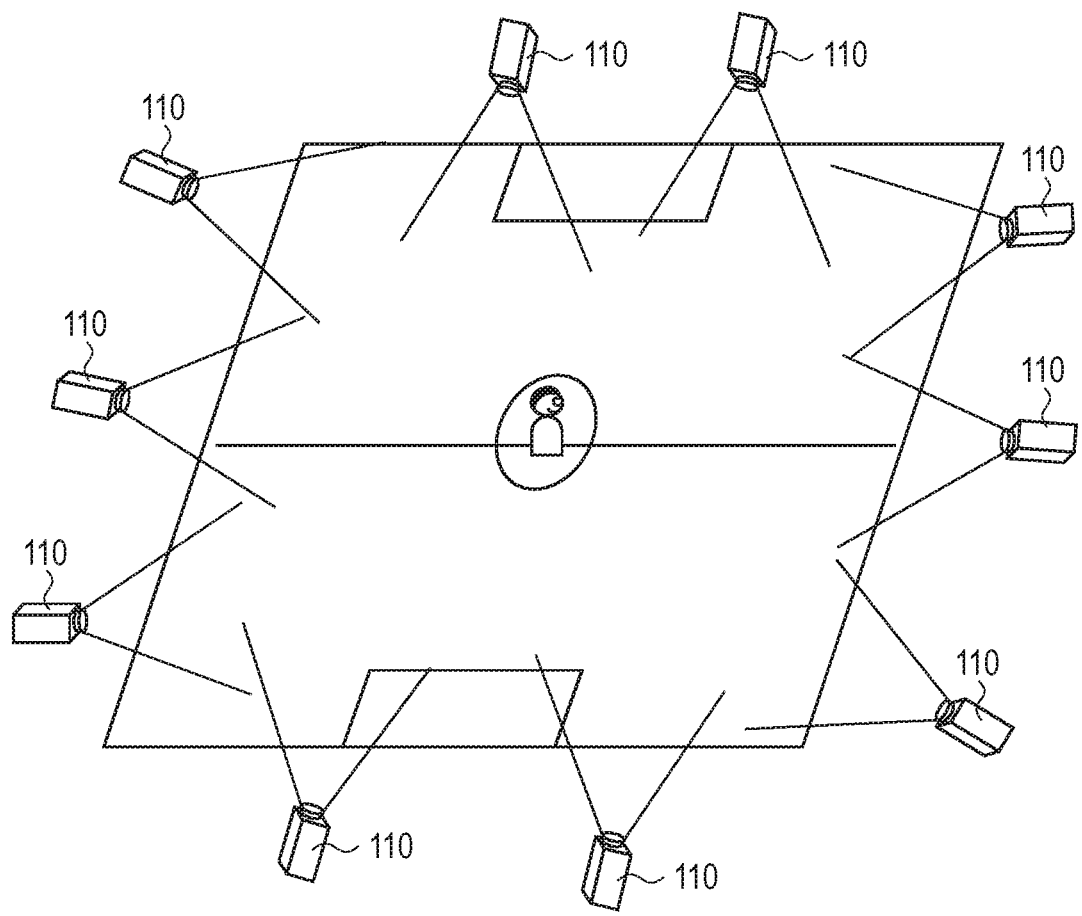
FIG. 2 is a diagram for describing an example of a state that image capturing apparatuses are disposed.

FIG. 2 is a diagram for describing an example of a state that the image capturing apparatuses 110 are disposed. In the present embodiment, the image capturing apparatuses 110 are respectively disposed so as to surround the soccer stadium, and capture all or part of the stadium.

The image generating apparatus 120 accumulates the images captured by the image capturing apparatus 110, receives virtual viewpoint information from the user terminal 130, and generates a virtual viewpoint image corresponding to the received virtual viewpoint information on the basis of the accumulated images. Here, the virtual viewpoint information is information of a viewpoint that is virtually disposed. The virtual viewpoint information includes, for example, information of a relative position with respect to a predetermined position in the stadium (e.g., the central position of the stadium). Besides, the virtual viewpoint information may include, for example, information of coordinates indicating the position of a viewpoint virtually disposed in a predetermined coordinate system (e.g., the world coordinate system). Besides, the virtual viewpoint information includes information indicating a capturing direction (i.e., a viewing direction from the virtual viewpoint).

The image generating apparatus 120 is, for example, an information processing apparatus such as a PC (personal computer), a server apparatus, a tablet device, or the like. The image generating apparatus 120 has previously stored, as a background image, a pre-game image that is obtained by capturing a scene of a competition venue being in a state that specific subjects (e.g., a player, a backup player, a director, a referee, a ball, a goal post, a goal net, etc.) do not exist.

The user terminal 130 is an information processing apparatus such as a PC, a tablet device, a smart phone, or the like. The user terminal 130 accepts input of information from a user, generates the virtual viewpoint information and information indicating an update content of the virtual viewpoint information based on the input information, and transmits the generated information to the image generating apparatus 120 via the network. Besides, the user terminal 130 displays the virtual viewpoint image received from the image generating apparatus 120 on a displaying unit, thereby presenting the virtual viewpoint image to the user. Thus, the user can confirm the virtual viewpoint image obtained from a designated virtual viewpoint.

Figure 3A:
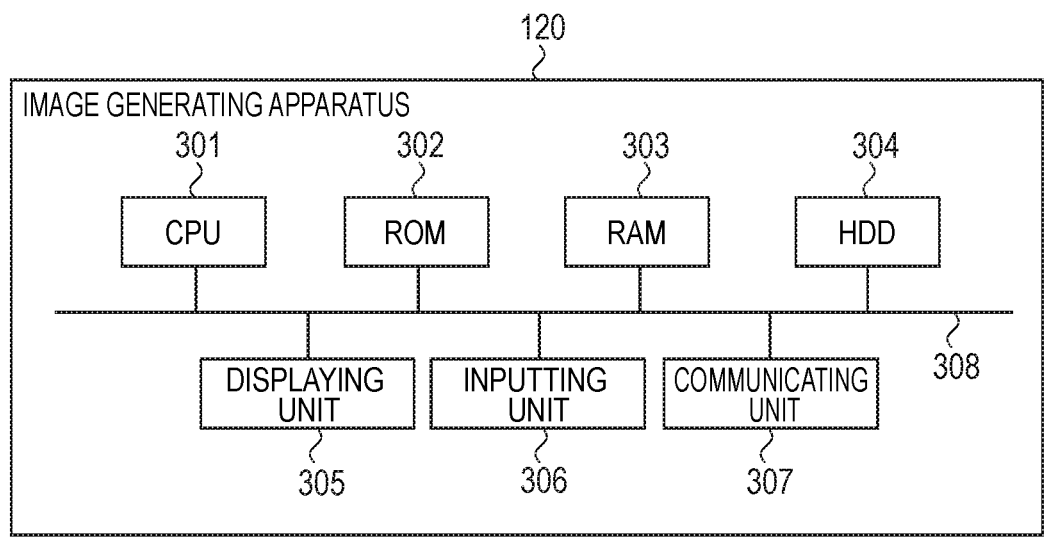
FIGS. 3A and 3B are diagrams for respectively describing examples of hardware constitutions of an image generating apparatus and the image capturing apparatus.

FIG. 3A is a diagram for describing an example of a hardware constitution of the image generating apparatus 120.

The image generating apparatus 120 includes a CPU (central processing unit) 301, a ROM (read only memory) 302, and a RAM (random access memory) 303. Further, the image generating apparatus 120 includes an HDD (hard disc drive) 304, a displaying unit 305, an inputting unit 306, and a communicating unit 307. The respective elements are communicably connected to others via a system bus 308.

The CPU 301 is a central processing unit that reads programs such as a control program, and the like, stored in the ROM 302, the HDD 304, and the like, and performs various processes based on the read programs. The ROM 302 is a storing unit that stores the control program, various setting information, and the like. The RAM 303 is a storing unit that is used as a temporary storage area such as a main memory, a working area, and the like, of the CPU 301. The HDD 304 is a storing unit that stores various setting information, the virtual viewpoint information, information of various images, various programs, and the like. Instead of the HDD 304, the image generating apparatus 120 may include a storing unit such as an SSD (solid-state drive), a flash memory, or the like. In addition to the HDD 304, the image generating apparatus 120 may include a storing unit such as the SSD, the flash memory, or the like. Each of the ROM 302, the RAM 303, and the HDD 304 is an example of a storage medium.

The displaying unit 305 is a displaying device such as a monitor, a displaying unit of a touch panel, or the like, for displaying various kinds of information. The inputting unit 306 is an inputting device such as a keyboard, a mouse, a six-axis controller, an operation unit of the touch panel, and the like. The communicating unit 307 is a communicating unit that communicates with external devices such as the image capturing apparatus 110, the user terminal 130, and the like, via the network.

Figure 4:
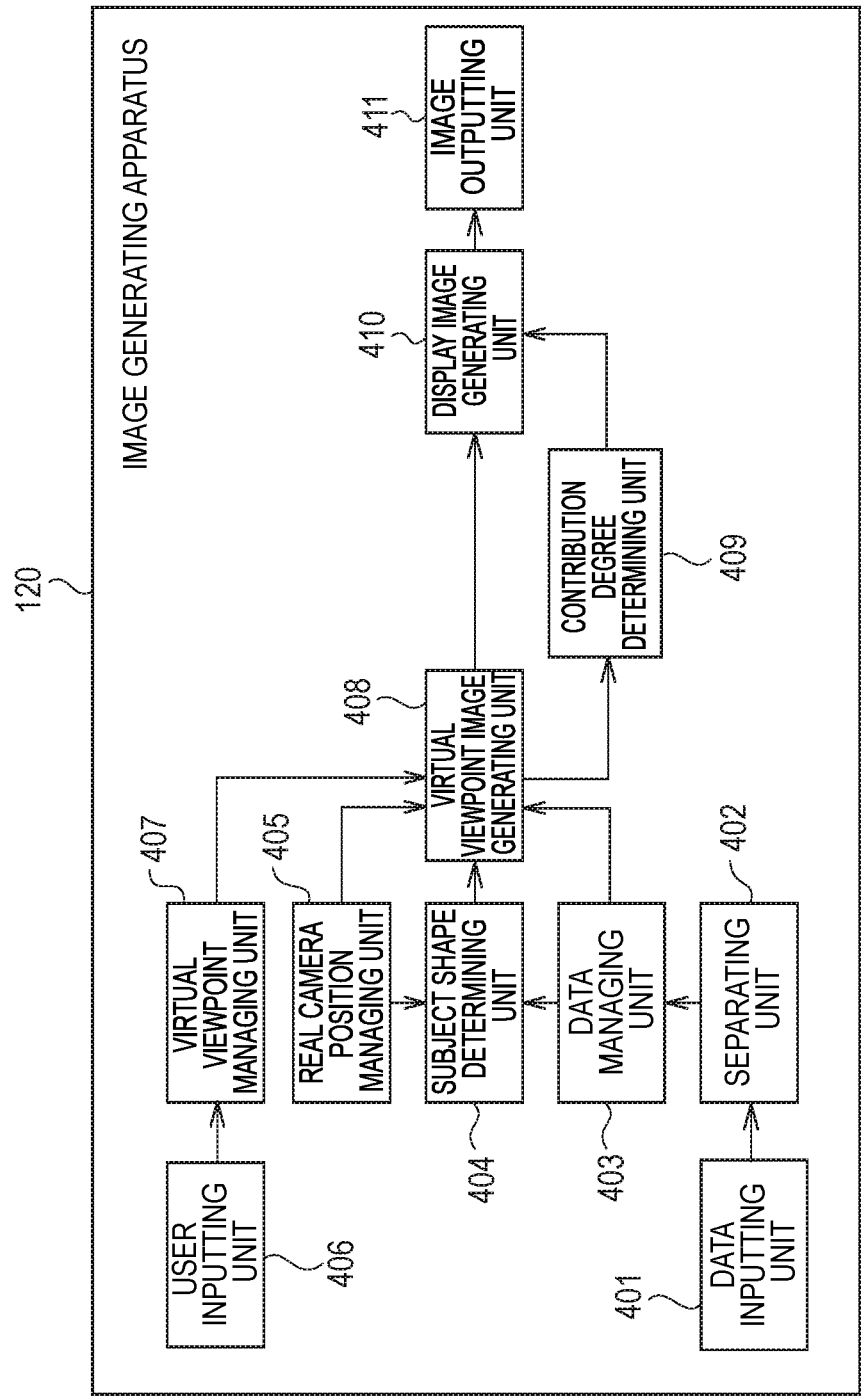
FIG. 4 is a diagram for describing an example of a functional configuration of the image generating apparatus.
Figure 5:
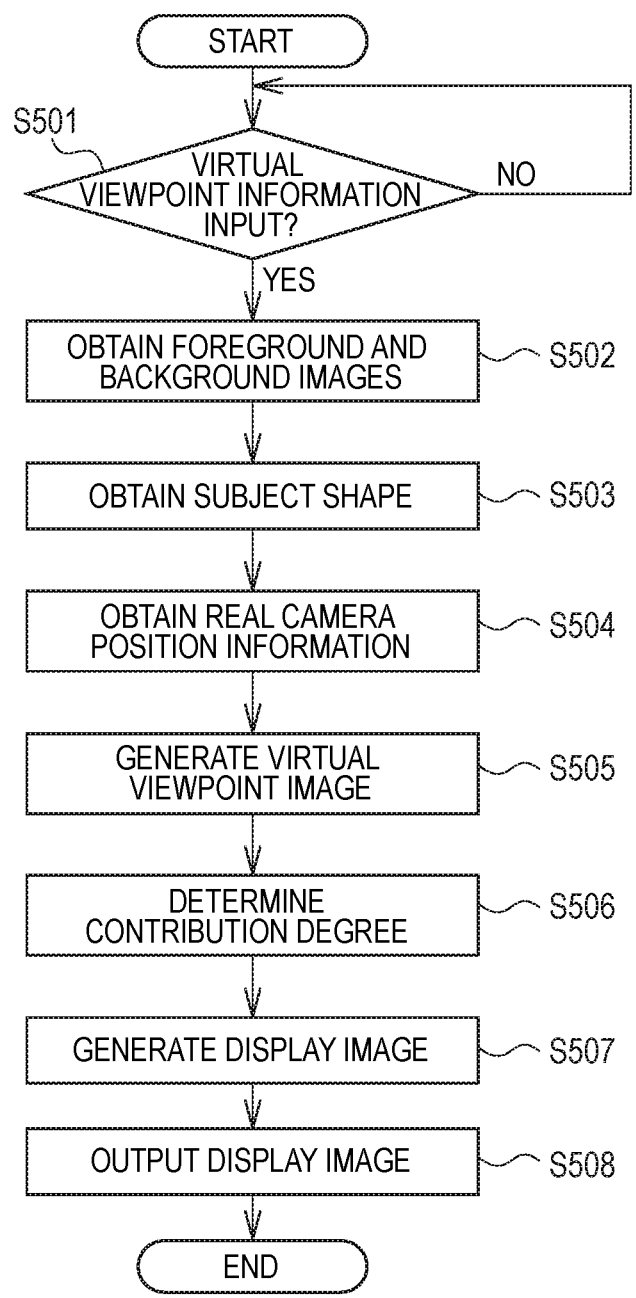
FIG. 5 is a flowchart for describing an example of a process to be performed by the image generating apparatus.
Figure 7:
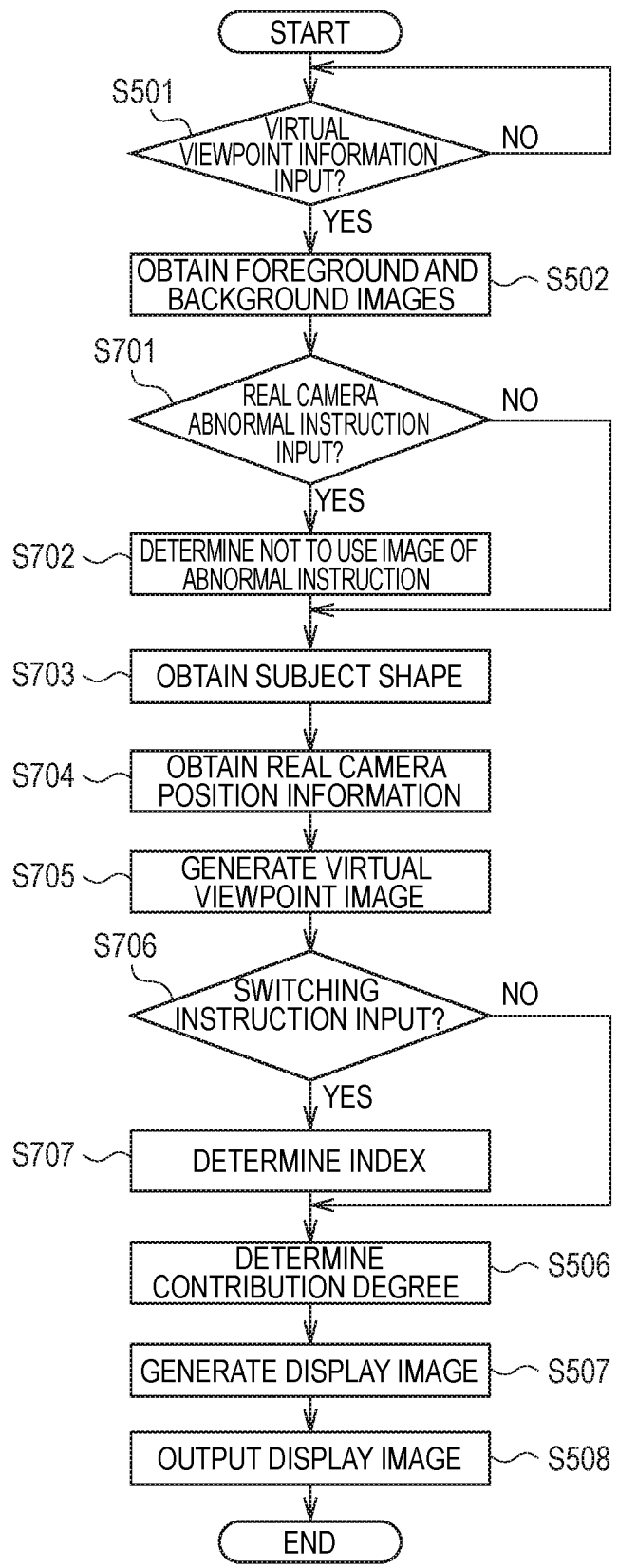
FIG. 7 is a flowchart for describing an example of a process to be performed by the image generating apparatus.
Figure 8:
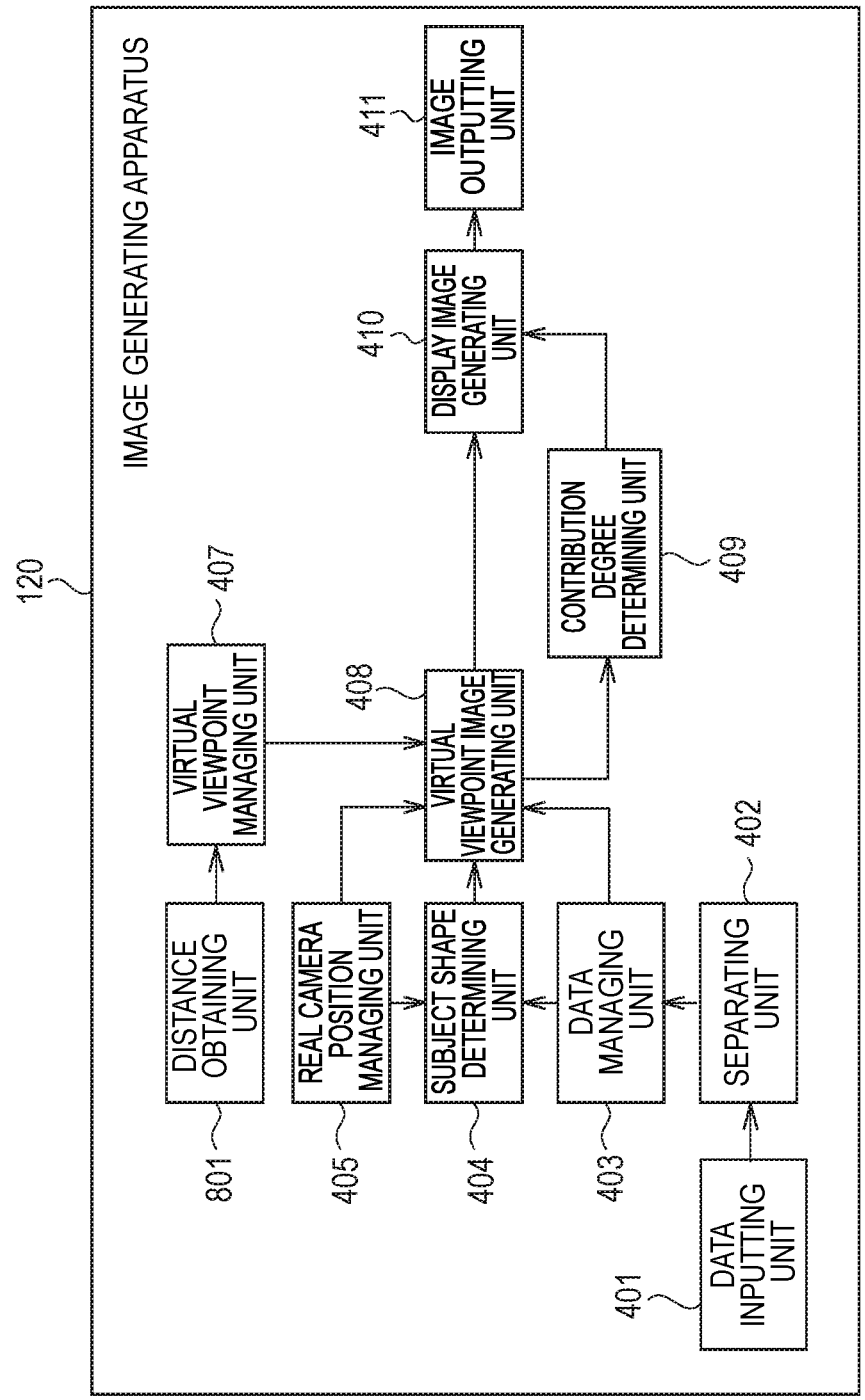
FIG. 8 is a diagram for describing an example of a functional configuration of the image generating apparatus.
Figure 9:
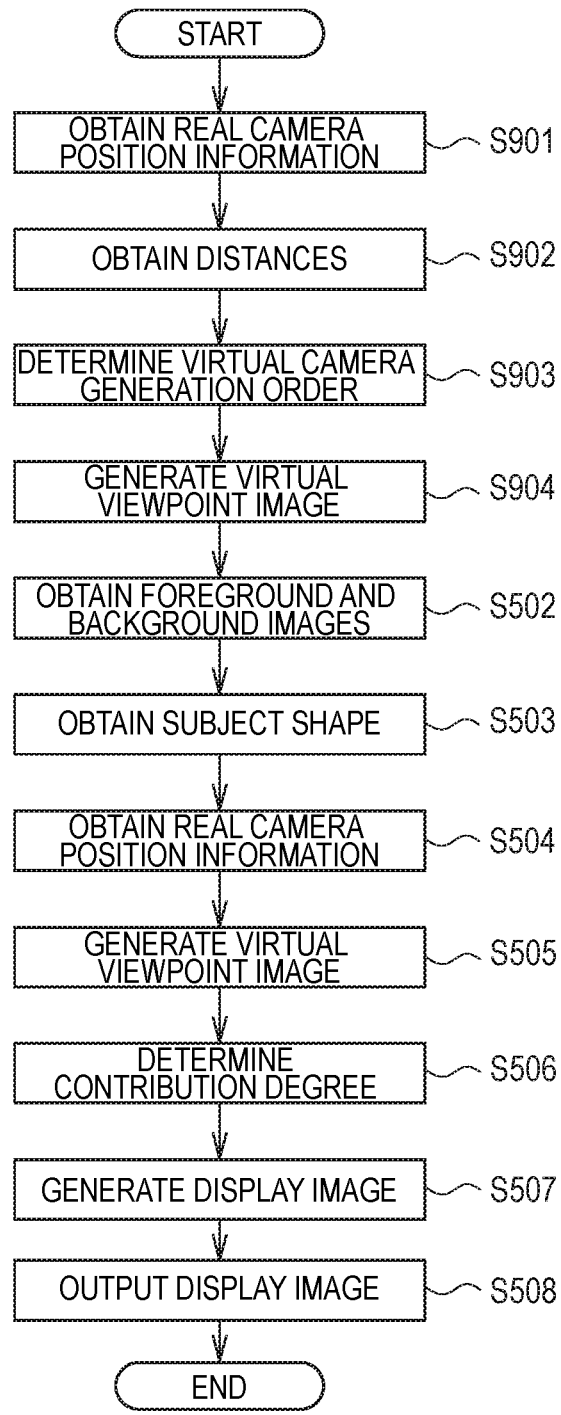
FIG. 9 is a flowchart for describing an example of a process to be performed by the image generating apparatus.

When the CPU 301 performs processes in accordance with the program stored in the ROM 302 or the HDD 304, functions of the image generating apparatus 120 later described in FIGS. 4 and 8 and processes of flowcharts later described in FIGS. 5, 7, and 9 are realized.

The hardware constitution of the user terminal 130 is similar to the hardware constitution of the image generating apparatus 120.

The CPU of the user terminal 130 performs the process according to the program stored in the ROM or the HDD of the user terminal 130, so that the functions of the user terminal 130, the process of the user terminal 130, and the like, are realized.

Figure 3B:
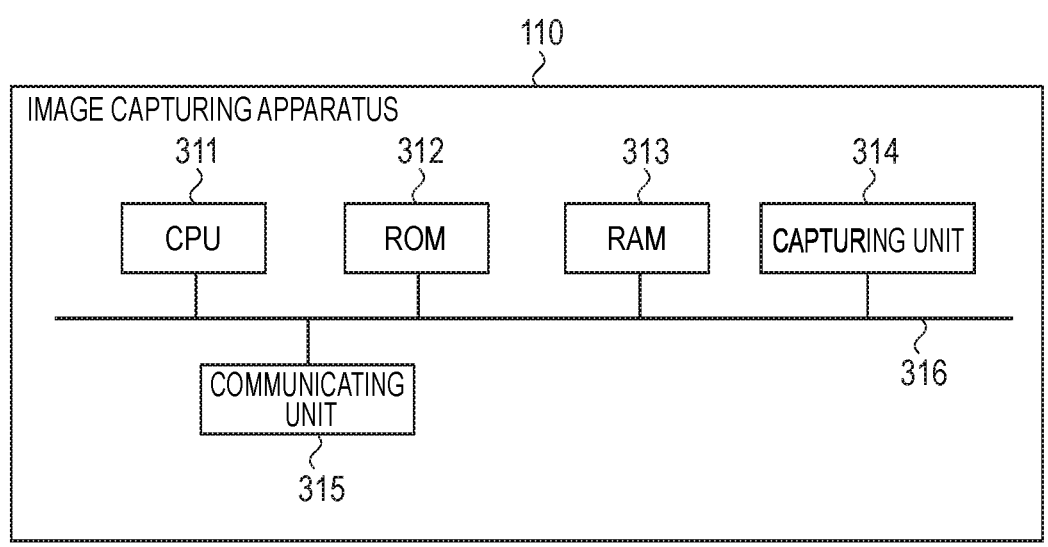

FIG. 3B is a diagram for describing an example of a hardware constitution of each of the image capturing apparatuses 110.

The image capturing apparatus 110 includes a CPU 311, a ROM 312, a RAM 313, a capturing unit 314, and a communicating unit 315. The respective elements are communicably connected to others via a system bus 316.

The CPU 311 is a central processing unit that controls the image capturing apparatus 110. The ROM 312 is a storing unit that stores various setting information and various programs. The RAM 313 is a storing unit that functions as a working area of the CPU 311, and a temporary storage location of data such as the image captured by the capturing unit 314.

The capturing unit 314 includes an image capturing element such as a CCD (charge-coupled device) sensor, a CMOS (complementary metal-oxide semiconductor) sensor, or the like, and a lens, and is a capturing unit that captures an image. The communicating unit 315 is a communicating unit that communicates with an external apparatus such as the image generating apparatus 120, or the like, via the network.

When the CPU 311 performs processes in accordance with the program stored in the ROM 312, the functions of the image capturing apparatus 110, the process of the image capturing apparatus 110, and the like, are realized.

FIG. 4 is a diagram for describing an example of a functional configuration of the image generating apparatus 120.

The image generating apparatus 120 includes a data inputting unit 401, a separating unit 402, a data managing unit 403, a subject shape determining unit 404, a real camera position managing unit 405, a user inputting unit 406, a virtual viewpoint managing unit 407, and a virtual viewpoint image generating unit 408. Besides, the image generating apparatus 120 includes a contribution degree determining unit 409, a display image generating unit 410, and an image outputting unit 411.

The data inputting unit 401 accepts and receives an input of an image captured by the image capturing apparatus 110 from the image capturing apparatus 110, and transfers the received image to the separating unit 402.

The separating unit 402 transfers, to the data managing unit 403, an image that is transferred from the data inputting unit 401 and is in a state that there is no subject, as the background image. Further, the separating unit 402 performs, based on the background image, an image process to an image that is transferred from the data inputting unit 401 and is in a state that a subject exists, separates the image of the subject as a foreground image, and transfers the separated image of the subject to the data managing unit 403 as the foreground image. For example, the separating unit 402 uses an object extracting method such as a method of extracting a difference between the image obtained by capturing the subject and the background image. Besides, the separating unit 402 may separate a moving body portion as the foreground image being the subject. In addition to the separated foreground image, the separating unit 402 may also transfer an original image before being separated into the foreground image and the background image to the data managing unit 403.

The data managing unit 403 stores, in the HDD 304, or the like, the background image that is the image obtained by capturing the state that there is no subject out of the images transferred from the separating unit 402. Besides, the data managing unit 403 stores, in the HDD 304, or the like, the foreground image that is separated from the image obtained by capturing the state that the subject exists, among the images input from the separating unit 402. In a case when the original image before being separated into the foreground image and the background image is transferred from the separating unit 402, the data managing unit 403 stores the transferred image as the original image in the HDD 304, or the like. Besides, the data managing unit 403 transfers the foreground image to the subject shape determining unit 404. Besides, the data managing unit 403 receives requests for the background image and the foreground image from the virtual viewpoint image generating unit 408, and transfers the background image and the foreground image according to the requests to the virtual viewpoint image generating unit 408. In addition to the foreground image according to the request, the data managing unit 403 may transfer the original image corresponding to the foreground image to the virtual viewpoint image generating unit 408.

The subject shape determining unit 404 determines the shape of the subject by using the foreground image transferred from the data managing unit 403 and real camera position information transferred from the real camera position managing unit 405. Here, the real camera position information is information that indicates the position of each of the image capturing apparatuses 110 that actually performs capturing. The real camera position information includes, for example, information of the coordinates indicating the position of each of the image capturing apparatuses 110 in a predetermined coordinate system, and information of a capturing direction of each of the image capturing apparatuses 110. The subject shape determining unit 404 determines the shape of the subject by using, for example, a three-dimensional shape restoring method such as a volume intersection method, and generates shape model information that is information of a model (hereafter referred to as a shape model) indicating the shape of the subject. Besides, the subject shape determining unit 404 transfers the generated shape model information to the virtual viewpoint image generating unit 408.

The real camera position managing unit 405 manages the real camera position information indicating the position of each of the image capturing apparatuses 110 stored in the HDD 304, or the like. It is assumed that, in the HDD 304, or the like, the information indicating the position of each of the image capturing apparatuses 110 previously measured by three-dimensional scanning, or the like, for the entire stadium to be captured is previously stored as the real camera position information. In the present embodiment, the position of each of the image capturing apparatuses 110 is identified by the measurement. However, each of the image capturing apparatuses 110 may be disposed at a predetermined position. In such a case, there is no need to measure the position of the image capturing apparatus 110. Besides, the real camera position managing unit 405 transfers the real camera position information to the subject shape determining unit 404 and the virtual viewpoint image generating unit 408. Besides, the real camera position managing unit 405 may transfer the real camera position information to the display image generating unit 410.

The user inputting unit 406 receives command data indicating an instruction to the image generating apparatus 120 from the user terminal 130. When the received command data indicates a virtual viewpoint update instruction, the user inputting unit 406 transfers the virtual viewpoint information or information indicating an update content of the virtual viewpoint information included in the received command data to the virtual viewpoint managing unit 407.

Based on the virtual viewpoint information or the information indicating the update content of the virtual viewpoint information transferred from the user inputting unit 406, the virtual viewpoint managing unit 407 updates the virtual viewpoint information which is stored in the HDD 304, or the like, and indicates current virtual camera position and capturing direction. Hereafter, it is assumed that the virtual viewpoint information that is stored in the HDD 304, or the like, and indicates the current position and capturing direction of the virtual camera is as virtual camera viewpoint information. The position of the virtual camera is managed as the coordinates in a predetermined coordinate system. The origin of the coordinate system is preset to, for example, the center, or the like, of the stadium to be captured. The virtual viewpoint managing unit 407 transfers the virtual camera viewpoint information stored in the HDD 304, or the like, to the virtual viewpoint image generating unit 408.

The virtual viewpoint image generating unit 408 receives the foreground image and the background image from the data managing unit 403, receives the shape model information from the subject shape determining unit 404, and receives the real camera position information from the real camera position managing unit 405. Besides, the virtual viewpoint image generating unit 408 receives the virtual camera viewpoint information from the virtual viewpoint managing unit 407. Then, the virtual viewpoint image generating unit 408 generates the virtual viewpoint image on the basis of the foreground image, the background image, the shape model information, the real camera position information and the virtual camera viewpoint information that were received.

For example, the virtual viewpoint image generating unit 408 generates the virtual viewpoint image by using a method called an MBR (model-based rendering). The MBR is the method of generating the virtual viewpoint image by using a three-dimensional model generated based on a plurality of images obtained by capturing the subject from a plurality of directions. More specifically, the MBR is a technique of generating the virtual viewpoint image by projecting as a rendering image a plurality of captured images corresponding to appearance of a three-dimensional shape from the virtual viewpoint, to a three-dimensional shape (model) of a target scene obtained by the three-dimensional shape restoring method such as the volume intersection method, an MSV (multi-view-stereo), or the like. The virtual viewpoint image generating unit 408 may generate the virtual viewpoint image by using a rendering method other than the MBR.

Based on color information of the foreground image (the image captured by the image capturing apparatus 110), the virtual viewpoint image generating unit 408 performs coloring (rendering) to the shape model indicated by the shape model information viewed from the viewpoint indicated by the virtual camera viewpoint information. Then, the virtual viewpoint image generating unit 408 disposes the colored shape model on a background model, and generates an image from the viewpoint indicated by the virtual camera viewpoint information as the virtual viewpoint image.

For example, in a case when a subject model is viewed from the viewpoint of the virtual camera, the virtual viewpoint image generating unit 408 performs a following process when, within a predetermined range centered on the subject model, there is a position of the image capturing apparatus 110 indicated by the received real camera position information. That is, when there is the image capturing apparatus 110 located within the predetermined range, the virtual viewpoint image generating unit 408 determines the color of the shape model based on the color of the foreground image (the image in which the subject has been captured) captured by the relevant image capturing apparatus 110.

Besides, the virtual viewpoint image generating unit 408 transfers the generated virtual viewpoint image to the display image generating unit 410. In addition, the virtual viewpoint image generating unit 408 transfers, to the contribution degree determining unit 409, the image (foreground image, background image) used for generating the virtual viewpoint image, and information indicating which image was used and in what way it was used for the generation of the virtual viewpoint image. In the following, the information indicating which image was used and in what way it was used for the generation of the virtual viewpoint image is as generation information. For example, in a case when the shape model of the subject is composed of a point group having three-dimensional information, the generation information includes information indicating which image was used for coloring each of the points included in the point group. Further, for example, the generation information includes information indicating which image was used to generate the shape model information of a subject viewed from the viewpoint indicated by the virtual camera viewpoint information.

Based on the generation information transferred from the virtual viewpoint image generating unit 408, the contribution degree determining unit 409 determines, for each image transferred from the virtual viewpoint image generating unit 408, a contribution degree that is an index indicating a degree of contribution in the generation of the virtual viewpoint image. Then, the contribution degree determining unit 409 associates each image transferred from the virtual viewpoint image generating unit 408 with the determined contribution degree, and transfers the obtained image to the display image generating unit 410. For example, the contribution degree determining unit 409 identifies the image used for coloring of each point included in the shape model represented by the point group of the subject viewed from the virtual viewpoint, based on the generation information transferred from the virtual viewpoint image generating unit 408. Then, the contribution degree determining unit 409 determines the contribution degree for each image transferred from the virtual viewpoint image generating unit 408, such that the image having the greater number of times used for the coloring has a higher contribution. Besides, the contribution degree determining unit 409 determines the contribution degree for each image transferred from the virtual viewpoint image generating unit 408, such that the contribution degree of the image used for generating the shape model of the subject viewed from the virtual viewpoint is higher than the contribution degree of the image not used.

By using the virtual viewpoint image transferred from the virtual viewpoint image generating unit 408 and the image associated with the contribution degree transferred from the contribution degree determining unit 409, the display image generating unit 410 generates the image to be displayed on a displaying unit such as the displaying unit of the user terminal 130, or the like. In the following, the image that is generated by the display image generating unit 410 and is to be displayed on the displaying unit is as a display image. For example, the display image generating unit 410 generates an image of a predetermined size as an initial display image. Then, for example, the display image generating unit 410 disposes the virtual viewpoint image transferred from the virtual viewpoint image generating unit 408 at a predetermined position in the display image.

The display image generating unit 410 determines an image to be displayed on the displaying unit by including it in the display image, from the image associated with the contribution degree transferred from the contribution degree determining unit 409. In the following, among the images associated with the contribution degree transferred from the contribution degree determining unit 409, an image to be displayed on the displaying unit is as a display target image. For example, the display image generating unit 410 determines the display target image based on the contribution degree of each of the images associated with the contribution degree transferred from the contribution degree determining unit 409. For example, the display image generating unit 410 determines, as the display target image, an image of which the corresponding contribution degree is a predetermined threshold or more. Besides, for example, the display image generating unit 410 may determine, as the display target image, a predetermined number of images sequentially from the one having the highest corresponding contribution degree. Thus, the image processing system 100 can display on the displaying unit the display target image that contributes much to the generation of the virtual viewpoint image. In a case when a deterioration of quality of the virtual viewpoint image occurs, it can be assumed that the cause of the deterioration is in the image that contributed much to the generation of the virtual viewpoint image. Therefore, by displaying, on the displaying unit, only the images contributing much to the generation of the virtual viewpoint image, the image processing system 100 can cause the user to more easily grasp the cause of the deterioration of quality of the virtual viewpoint image.

Besides, for example, among the images associated with the contribution degree transferred from the contribution degree determining unit 409, the display image generating unit 410 may determine the display target image based on a positional relationship between the position of the virtual camera indicated by the virtual camera viewpoint information and the position of each of the image capturing apparatuses 110. The display image generating unit 410 can obtain the position of each of the image capturing apparatuses 110 from the real camera position information transferred from the real camera position managing unit 405. In that case, for example, the display image generating unit 410 identifies, among the images associated with the contribution degree transferred from the contribution degree determining unit 409, the image captured by the image capturing apparatus 110 that exists at the position of which the distance from the position of the viewpoint indicated by the virtual camera viewpoint information is a predetermined threshold or less. Then, the display image generating unit 410 determines the identified image as the display target image. Thus, the image processing system 100 can display, among the images associated with the contribution degree transferred from the contribution degree determining unit 409, the image captured by the image capturing apparatus that exists at the position of which the distance from the position of the virtual camera is the threshold or less, on the displaying unit. There is a case when the virtual viewpoint image is generated from an image captured by the image capturing apparatus that exists at a position of which the distance from the virtual camera is a certain distance or less. Therefore, by displaying, on the displaying unit, the images respectively captured by the image capturing apparatuses that exist at the positions of which the distances from the position of the virtual camera are the threshold or less, the image processing system 100 can cause the user to more easily grasp the cause of the deterioration of quality of the virtual viewpoint image.

Besides, for example, the display image generating unit 410 may determine all the images associated with the contribution degree transferred from the contribution degree determining unit 409, as the display target images. Further, for example, the display image generating unit 410 may determine, as the display target image, an image captured by a predetermined image capturing apparatus among the images associated with the contribution degree transferred from the contribution degree determining unit 409.

The display image generating unit 410 determines a size within the display image for each of the determined display target images. For example, the display image generating unit 410 determines the size within the display image based on the contribution degree corresponding to each of the display target images. For example, the display image generating unit 410 determines the size of each of the display target images in the display image such that the size within the display image becomes larger as the corresponding contribution degree is higher. Thus, the image processing system 100 can display, with a larger size, the display target image that contributes much to the generation of the virtual viewpoint image on the displaying unit. In the case when the deterioration of quality of the virtual viewpoint image occurs, it can be assumed that the cause of the deterioration is in the image that contributed much to the generation of the virtual viewpoint image. Therefore, by displaying the images, with a larger size, contributing much to the generation of the virtual viewpoint image on the displaying unit, the image processing system 100 can cause the user to more easily grasp the cause of the deterioration of quality of the virtual viewpoint image.

Besides, for example, the display image generating unit 410 may determine, for each of the display target images, the size of the display image based on the positional relationship between the position of the virtual camera indicated by the virtual camera viewpoint information and the position of each of the image capturing apparatuses 110. In that case, for example, the display image generating unit 410 identifies, for each of the display target images, the distance between the image capturing apparatus that performs the capturing and the virtual camera. Then, the display image generating unit 410 determines the size of the display image of the display target image captured by the image capturing apparatus corresponding to the identified distance, such that the smaller the specified distance, the larger the size. Thus, the image processing system 100 can display the display target image on the displaying unit in a larger size as the image capturing apparatus that performs the capturing is closer to the virtual camera, so that it is possible to cause the user to more easily grasp the cause of the deterioration of quality of the virtual viewpoint image.

Besides, for example, the display image generating unit 410 may determine the size of the display image as a predetermined size, for all the display target images.

The display image generating unit 410 disposes the display target images in the display image.

For example, the display image generating unit 410 arranges and displays the display target images for which the sizes have been determined, in a predetermined area in the display image. For example, the display image generating unit 410 arranges and disposes the display target images for which the sizes have been determined in a predetermined area in the display image, in order from the top to the bottom in descending order of size. Besides, for example, the display image generating unit 410 arranges and disposes the display target images for which the sizes have been determined in a predetermined area in the display image, in order from the left to the right in descending order of size.

Besides, for each of the display target images for which the sizes have been determined, the display image generating unit 410 may determine a position in the display image based on the positional relationship between the position of the virtual camera indicated by the virtual camera viewpoint information and the position of each of the image capturing apparatuses 110. In that case, for example, on the premise that, with reference to the position of the virtual camera, the horizontal capturing direction of the virtual camera is set as a front direction and the direction of the ground is set as a downward direction, the display image generating unit 410 identifies whether each of the image capturing apparatuses that captures the display target image is on the right side of the virtual camera or on the left side. Then, the display image generating unit 410 determines to display the display target image captured by the image capturing apparatus identified as existing on the right side of the virtual camera, in a predetermined area on the right side of the center of the area where the virtual viewpoint image in the display image is disposed. Besides, the display image generating unit 410 determines to display the display target image captured by the image capturing apparatus identified as existing on the left side of the virtual camera, in a predetermined area on the left side of the center of the area where the virtual viewpoint image in the display image is disposed.

Then, the display image generating unit 410 arranges and disposes the display target images determined to be displayed in the predetermined area on the right side of the center of the area where the virtual viewpoint image in the display image is disposed within the predetermined area, for example, in order from the top to the bottom in descending order of size. Besides, the display image generating unit 410 arranges and disposes the display target images determined to be displayed in the predetermined area on the left side of the center of the area where the virtual viewpoint image in the display image is disposed within the predetermined area, for example, in order from the top to the bottom in descending order of size.

Thus, the image processing system 100 can display each of the display target images in a display mode corresponding to the direction with respect to the virtual camera of each of the image capturing apparatuses that captures the display target image. By visually confirming the displayed image, the user can more easily grasp which display target image is the image captured by the image capturing apparatus located in which direction as viewed from the virtual camera.

Then, the display image generating unit 410 transfers the display image in which the virtual viewpoint image and each of the display target images are disposed, to the image outputting unit 411. Besides, in the display image in which the virtual viewpoint image and each of the display target images are disposed, the display image generating unit 410 may further dispose information indicating attribute information of the image capturing apparatus that captures each of the display target images, in a predetermined area of the display image. For example, the attribute information of the image capturing apparatus includes information such as exposure value, an angle of view, coordinates, an ISO (International Organization for Standardization) standard, a shutter speed, and the like. Thus, the user can more easily grasp with what type of image capturing apparatus the display target image was captured.

The image outputting unit 411 transmits the display image transferred from the display image generating unit 410 to the user terminal 130, and instructs the displaying unit to display the transmitted display image, thereby controlling to display the display image.

Incidentally, a part or the whole of the functional configuration illustrated in FIG. 4 may be realized by hardware. An example of the hardware may be an ASIC (application specific integrated circuit), an FPGA (field programmable gate array) or a GPU (graphics processing unit). Besides, another apparatus may have a part of the functional configuration illustrated in FIG. 4. Besides, a part or the whole of the functional configuration illustrated in FIG. 4 may be realized by a cooperation process by a plurality of apparatuses.

FIG. 5 is a flowchart for describing an example of a process to be performed by the image generating apparatus 120.

In step S501, the virtual viewpoint managing unit 407 determines via the user inputting unit 406 whether or not the virtual viewpoint information or the information indicating an update content of the virtual viewpoint is received from the user terminal 130. When it is determined that the virtual viewpoint information or the information indicating the update content of the virtual viewpoint is received from the user terminal 130, the virtual viewpoint managing unit 407 updates the virtual camera viewpoint information based on the received virtual viewpoint information or the received information indicating the update content of the virtual viewpoint. Then, the virtual viewpoint managing unit 407 transfers the updated virtual camera viewpoint information to the virtual viewpoint image generating unit 408, and the process proceeds to step S502. On the other hand, when it is determined that the virtual viewpoint information or the information indicating the update content of the virtual viewpoint is not received from the user terminal 130, the virtual viewpoint managing unit 407 repeats the process of step S501.

In step S502, the virtual viewpoint image generating unit 408 identifies the viewpoint indicated by the virtual camera viewpoint information transferred from the virtual viewpoint managing unit 407 in step S501. Then, the virtual viewpoint image generating unit 408 requests the data managing unit 403 to transfer the foreground image and background image separated from the image in which the area capable of being captured by the virtual camera from the identified viewpoint has been captured. Then, the virtual viewpoint image generating unit 408 obtains the foreground image and the background image respectively corresponding to the request from the data managing unit 403. For example, the virtual viewpoint image generating unit 408 identifies the image capturing apparatus 110 that is capable of capturing an area of the stadium captured from the viewpoint indicated by the virtual camera viewpoint information. The virtual viewpoint image generating unit 408 then obtains the foreground image and the background image respectively separated from the image captured by the identified image capturing apparatus 110, from the data managing unit 403. In addition to the foreground image, the virtual viewpoint image generating unit 408 may obtain the corresponding original image from the data managing unit 403.

In step S503, the virtual viewpoint image generating unit 408 obtains the shape model information from the subject shape determining unit 404, with respect to the subject capable of being captured by the virtual camera from the viewpoint indicated by the virtual camera viewpoint information.

In step S504, the virtual viewpoint image generating unit 408 obtains the real camera position information for the image capturing apparatus 110 that captures the area capable of being captured by the virtual camera from the viewpoint indicated by the virtual camera viewpoint information, from the real camera position managing unit 405.

In step S505, the virtual viewpoint image generating unit 408 generates the virtual viewpoint image based on the virtual camera viewpoint information, and the foreground image, the background image, the shape model information and the real camera position information obtained in steps S502 to S504.

In step S506, the contribution degree determining unit 409 determines the contribution degree indicating how much contributed to the generation of the virtual viewpoint image, with respect to each of the images used for generating the virtual viewpoint image obtained from the virtual viewpoint image generating unit 408. For example, the contribution degree determining unit 409 determines the contribution degree of each image, based on the number of times used for coloring each of points included in the point group of the shape model of the subject of each image. Besides, the contribution degree determining unit 409 may determine the real camera having the viewpoint close to the viewpoint of the virtual camera indicated by the information obtained in step S501, as the real camera that captures the image of high contribution degree.

In step S507, the display image generating unit 410 generates the display image in which the virtual viewpoint image transferred from the virtual viewpoint image generating unit 408 and the image associated with the contribution degree transferred from the contribution degree determining unit 409 are associated and disposed.

In step S508, the image outputting unit 411 outputs the display image generated in step S507 to the user terminal 130. More specifically, the image outputting unit 411 transmits the display image generated in step S507 to the user terminal 130, and instructs the displaying unit of the user terminal 130 to display the display image, thereby outputting the display image. The image outputting unit 411 may output the display image generated in step S507 by displaying it on the displaying unit 305 of the image generating apparatus 120. Besides, the image outputting unit 411 may output the display image generated in step S507 by displaying it on an external screen or the like via a projector or the like. The process of step S508 is an example of a display controlling process.

Figure 6:
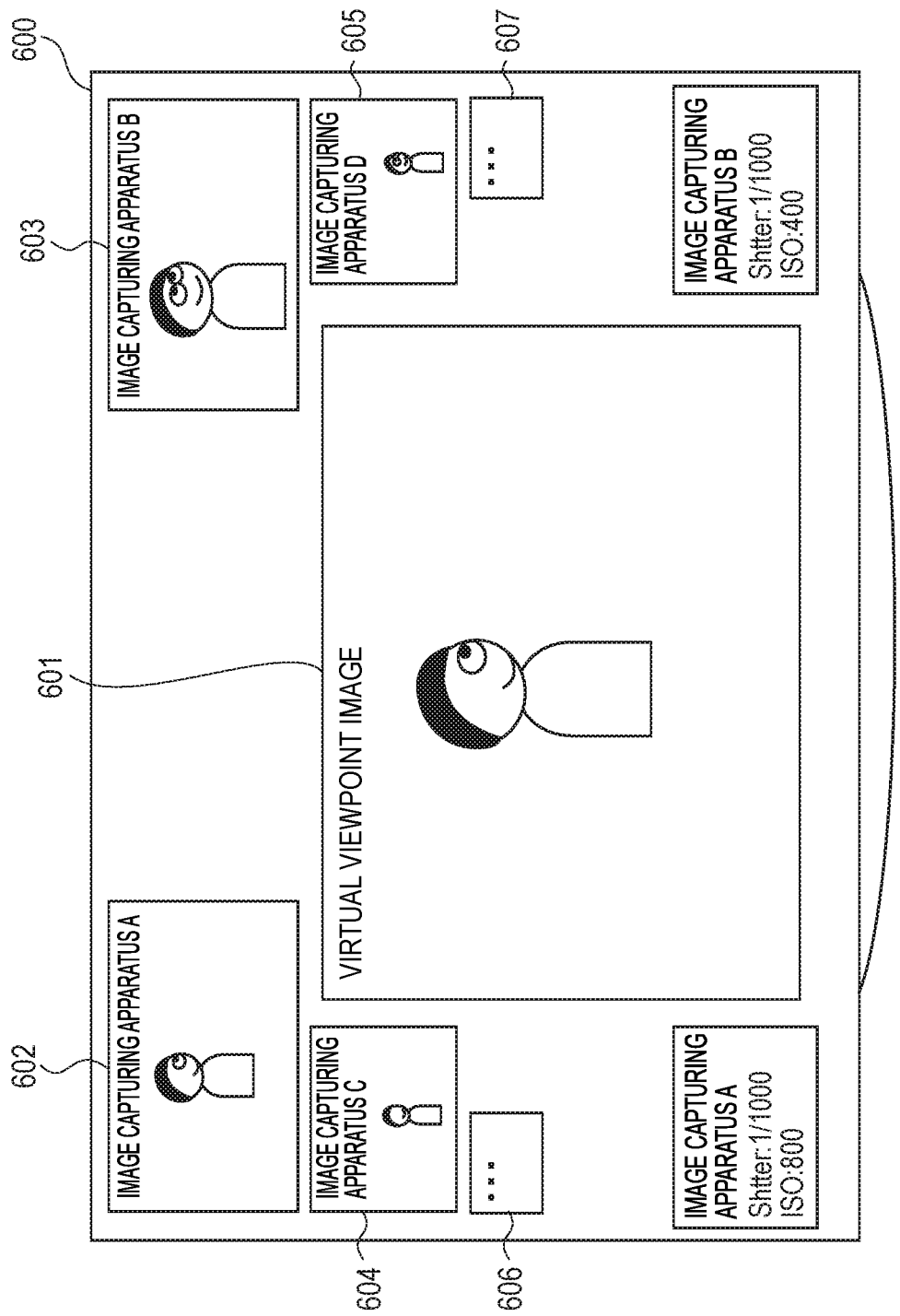
FIG. 6 is a diagram for describing an example of a display state of a display image.

FIG. 6 is a diagram for describing an example of a state that a display image is displayed on the displaying unit of the user terminal 130. Here, an area 600 is a display area of the displaying unit of the user terminal 130. In the example of FIG. 6, the state that the display image is displayed in the entire area 600 is shown. An image 601 is a virtual viewpoint image. In the example of FIG. 6, the state that the image 601 being the virtual viewpoint image is displayed in the area below the center of the area 600 is shown. Images 602 to 606 are display target images, respectively. In the example of FIG. 6, the size of the display target image becomes larger as the contribution degree of the relevant display target image is higher. That is, the contribution degree of the image 602 is higher than those of the images 604 and 606. Further, the contribution degree of the image 604 is higher than that of the image 606. Furthermore, the contribution degree of the image 603 is higher than those of the images 605 and 607. Furthermore, the contribution degree of the image 605 is higher than that of the image 607.

Besides, in the example of FIG. 6, the direction of the display target image with respect to the virtual viewpoint image is the direction corresponding to the direction of the virtual camera of the image capturing apparatus that captures each of the display target images. That is, in a case when the horizontal capturing direction of the virtual camera is set as a front direction and the direction of the ground is set as a downward direction, the display target image captured by the image capturing apparatus located on the right side as viewed from the virtual camera is disposed on the right side of the center of the virtual viewpoint image. On the other hand, the display target image captured by the image capturing apparatus located on the left side as viewed from the virtual camera is disposed on the left side of the center of the virtual viewpoint image. Therefore, the image capturing apparatus that captures each of the images 602, 604, and 606 exists on the left side as viewed from the virtual camera, whereas the image capturing apparatus that captures each of the images 603, 605, and 607 exists on the right side as viewed from the virtual camera.

Incidentally, the example shown in FIG. 6 is merely an example, and the images 601 to 607, and the like, may be displayed in another display form. For example, the display image generating unit 410 may display the captured images of the real cameras in a uniform size irrespective of the contribution degrees. Besides, in a case when operation information indicating that any one of the images 602 to 607 has been operated is received from the user terminal 130, the display image generating unit 410 may generate a display image in which the operated image is enlarged and displayed. Besides, the display image generating unit 410 may generate a display image for discriminably highlighting the captured image of the image capturing apparatus of which the capturing parameter such as exposure, or the like, is different from that of other image capturing apparatuses. Besides, the display image generating unit 410 may generate a display image for detecting a cause of the deterioration of quality of the virtual viewpoint image, such as an obstacle, or the like, by an image process, and discriminably highlighting the captured image of the camera that captures the relevant obstacle.

In the present embodiment, the image processing system 100 displays the display image in which the virtual viewpoint image and the display target images are disposed, on one displaying unit of the user terminal 130. However, the image processing system 100 may divisionally display the virtual viewpoint image and the display target images, on a plurality of displaying units. For example, the display image generating unit 410 transfers the images determined as the virtual viewpoint image and the display target images to the image outputting unit 411. The image outputting unit 411 may transmit the virtual viewpoint image and the display target images as individual images to the user terminal 130, and instruct operation to divisionally display the transmitted images, respectively, on the plurality of displaying units connected to user terminal 130. In that case, for example, one image is displayed on one displaying unit.

In the present embodiment, the image processing system 100 determines the image to be the display target image from the previously captured background image, and the foreground image separated from the image captured by the image capturing apparatus 110. However, the image processing system 100 may determine the original image as the display target image. For example, the display image generating unit 410 determines the display target image by the method described in FIG. 4, and the like, and, when the determined display target image is the foreground image, obtains the original image corresponding to the relevant foreground image from the data managing unit 403. Then, the display image generating unit 410 may determine the obtained original image as the display target image related to the foreground image.

In the present embodiment, the image processing system 100 displays the image related to the generation of the virtual viewpoint image together with the virtual viewpoint image on the displaying unit of the user terminal 130. However, in a case when the virtual viewpoint image is displayed on the displaying unit of the user terminal 130 and the selection of a part of the virtual viewpoint image is accepted via the inputting unit of the user terminal 130, the image processing system 100 may perform the following process. That is, the image processing system 100 may determine, as the display target image, an image used for generating a portion of the selected part of the virtual viewpoint image, and display the determined display target image on the displaying unit of the user terminal 130.

In the present embodiment, the image processing system 100 always displays the display target image together with the virtual viewpoint image. However, the image processing system 100 may display the display target image only when the deterioration of quality of the virtual viewpoint image is detected. Besides, the image processing system 100 may display the display target image when occurrence of the deterioration of quality of the virtual viewpoint image is notified from the user via the inputting unit of the user terminal 130.

As described above, in the present embodiment, the image processing system 100 displays the image related to the generation of the virtual viewpoint image, together with the virtual viewpoint image being the image from the virtual viewpoint, on the displaying unit. By viewing the image displayed on the displaying unit, the user can visually recognize the image used for generating the virtual viewpoint image together with the virtual viewpoint image. Thus, the image processing system 100 can cause the user to be able to more easily grasp the cause of the deterioration of quality of the virtual viewpoint image.

Second Embodiment

In the present embodiment, a process of accepting, from a user, a designation of an image being a cause of the deterioration of quality of the virtual viewpoint image among the display target images displayed by the process of the first embodiment, and prohibiting use of the image indicated by the designation in the generation of the virtual viewpoint image, will be described.

The system configuration of the image processing system 100 of the present embodiment is the same as that of the first embodiment. Besides, the hardware constitution of each of the image capturing apparatus 110, the image generating apparatus 120 and the user terminal 130 of the present embodiment is the same as that of the first embodiment.

The CPU of the user terminal 130 of the present embodiment accepts a designation of an image being the cause of the deterioration of quality of the virtual viewpoint image from the display target image instructed to be displayed in the process of step S508 of the first embodiment, based on an operation by the user via the inputting unit of the user terminal 130. The CPU of the user terminal 130 transmits the information of the image indicated by the designation to the image generating apparatus 120, and instructs operation to prohibit the use of the image captured by the image capturing apparatus that captures the relevant image in the generation of the virtual viewpoint image.

As well as the first embodiment, the image generating apparatus 120 of the present embodiment includes the data inputting unit 401, the separating unit 402, the data managing unit 403, the subject shape determining unit 404, the real camera position managing unit 405, the user inputting unit 406, the virtual viewpoint managing unit 407, and the virtual viewpoint image generating unit 408. Besides, as well as the first embodiment, the image generating apparatus 120 includes the contribution degree determining unit 409, the display image generating unit 410, and the image outputting unit 411. Each of these units has the same function as that described in the first embodiment.

The functional configuration of the image generating apparatus 120 of the present embodiment will be described with respect to points different from the first embodiment.

The user inputting unit 406 has a function of performing a process as described below, in addition to the same function as that of the first embodiment.

In the first embodiment, the image generating apparatus 120 determines the contribution degree of each image used in the generation of the virtual viewpoint image, based on the number of times used for coloring the shape model of the subject, whether or not used for determining the shape model of the subject, and the like. In the present embodiment, the image processing system 100 determines the contribution degree of each image used in the generation of the virtual viewpoint image, based on a predetermined index selected among the number of times used for coloring the shape model of the subject, whether or not used for determining the shape model of the subject, and the like. Then, when an instruction to switch the index to be used for determining the contribution degree is received from the user terminal 130, the image generating apparatus 120 performs the following process. That is, based on the index indicated by the received switching instruction, the image generating apparatus 120 redetermines the contribution degree of each image used for generating the virtual viewpoint image, and determines the display target image again. Therefore, in the present embodiment, when the switching instruction is received from the user terminal 130, the user inputting unit 406 transfers the switching instruction to the contribution degree determining unit 409, or the like.

Besides, when a designation of the image that causes the deterioration of quality of the virtual viewpoint image is received from the user terminal 130, the user inputting unit 406 transfers the information of the designated image to the virtual viewpoint image generating unit 408.

In addition to the same functions as those of the first embodiment, the subject shape determining unit 404 has a function of performing a process as described below. When the designation of the image that causes the deterioration of quality of the virtual viewpoint image is transferred from the user inputting unit 406 to the virtual viewpoint image generating unit 408, the virtual viewpoint image generating unit 408 outputs information of the transferred designation to the subject shape determining unit 404. When the designation of the image that causes the deterioration of quality of the virtual viewpoint image is received, the subject shape determining unit 404 redetermines the shape of the subject without using the foreground image separated from the image captured by the image capturing apparatus that captures the image indicated by the received designation. Then, the subject shape determining unit 404 transfers the shape model information of the redetermined shape model to the virtual viewpoint image generating unit 408.

The virtual viewpoint image generating unit 408 generates the virtual viewpoint image without using the image (foreground image, background image) captured by the image capturing apparatus that captures the image indicated by the designation transferred from the user inputting unit. For example, the virtual viewpoint image generating unit 408 performs coloring of each point of the shape model by using an image captured by an image capturing apparatus other than the image capturing apparatus that captures the image indicated by the designation transferred from the user inputting unit.

In addition to the same functions as those of the first embodiment, the contribution degree determining unit 409 has a function of performing a process as described below. When the switching instruction is transferred from the user inputting unit 406, the contribution degree determining unit 409 redetermines the contribution degree of each image used for the generation of the virtual viewpoint image, based on an index indicated by the received switching instruction. For example, when the index indicated by the switching instruction is the number of times used for coloring the shape model of the subject, the contribution degree determining unit 409 redetermines the contribution degree based on the number of times used for coloring the shape model of the subject. Besides, when the index indicated by the switching instruction is whether or not used for determining the shape model of the subject, the contribution degree determining unit 409 redetermines the contribution degree based on whether or not used for determining the shape model of the subject.

FIG. 7 is a flowchart for describing an example of a process to be performed by the image generating apparatus 120 according to the present embodiment. In the process of FIG. 7, processes of steps S701 to S707 are provided instead of the processes of steps S503 to S505 in the process of FIG.

5. Incidentally, the processes of steps S501 to S502 and steps S506 to S508 of FIG. 7 are the same as the processes of steps S501 to S502 and steps S506 to S508 of FIG. 5. Hereafter, in the process of FIG. 7, only differences from the process of FIG. 5 will be described.

In step S701, the user inputting unit 406 determines whether or not the information of the image causing the deterioration of quality of the virtual viewpoint image is received from the user terminal 130. When it is determined that the information of the image causing the deterioration of quality of the virtual viewpoint image is received, the user inputting unit 406 transfers the information determined to be received to the virtual viewpoint image generating unit 408, and the process proceeds to step S702. On the other hand, when it is determined by the user inputting unit 406 that the information of the image causing the deterioration of quality of the virtual viewpoint image is not received, the process proceeds to step S703.

In step S702, the virtual viewpoint image generating unit 408 determines not to use the image captured by the image capturing apparatus that captures the image indicated by the information determined to be received in step S701, in generation of a subsequent virtual viewpoint image. Besides, the virtual viewpoint image generating unit 408 transfers the information of the image indicated by the information determined to be received in step S701, to the subject shape determining unit 404.

In step S703, the virtual viewpoint image generating unit 408 obtains the shape model information of the subject from the subject shape determining unit 404. In the case when the process of step S702 is being performed, the virtual viewpoint image generating unit 408 obtains the shape model information of the subject generated without using the image determined not to be used in step S702 from the subject shape determining unit 404. On the other hand, in the case when the process of step S702 is not performed, the virtual viewpoint image generating unit 408 performs the process same as that of step S503.

In step S704, the virtual viewpoint image generating unit 408 obtains the real camera position information from the real camera position managing unit 405. In the case when the process of step S702 is being performed, the virtual viewpoint image generating unit 408 does not obtain the real camera position information of the image capturing apparatus that captures the image determined not to be used in step S702. On the other hand, in the case when the process of step S702 is not performed, the virtual viewpoint image generating unit 408 performs the process same as that of step S504.

In step S705, the virtual viewpoint image generating unit 408 generates the virtual viewpoint image based on the virtual camera viewpoint information indicating the information of the current virtual camera viewpoint, the images (foreground image, background image) obtained in steps S702 to S704, the shape model information, and the real camera position information. In the case when the process of step S702 is being performed, the virtual viewpoint image generating unit 408 generates the virtual viewpoint image without using the image determined not to be used in step S702. On the other hand, in the case when the process of step S702 is not performed, the virtual viewpoint image generating unit 408 performs the process same as that of step S505.

In step S706, the user inputting unit 406 determines whether or not the switching instruction of the index to be used for determining the contribution degree is received from the user terminal 130. When it is determined that the switching instruction of the index to be used for determining the contribution degree is received from the user terminal 130, the user inputting unit 406 transfers the information of the index indicated by the switching instruction determined to be received to the contribution degree determining unit 409, and then, the process proceeds to step S707. On the other hand, when it is determined by the user inputting unit 406 that the switching instruction of the index to be used for determining the contribution degree is not received from the user terminal 130, the process proceeds to step S506.

In step S707, the contribution degree determining unit 409 determines, as the index indicated by the information transferred in step S706, the index to be used for determining the contribution degree to the generation of the virtual viewpoint image with respect to each image used for generating the virtual viewpoint image. Then, in step S506, the contribution degree determining unit 409 determines the contribution degree of each image based on the index determined in step S707. In the case when the process of step S707 is not performed, the contribution degree determining unit 409 determines in step S506 the contribution degree of each image based on a predetermined index. By the process of steps S706 to S707, the image processing system 100 can determine the contribution degree according to the designated index.

As described above, in the present embodiment, as well as the first embodiment, the image processing system 100 displays, on the displaying unit, the image related to the generation of the virtual viewpoint image together with the virtual viewpoint image. The image processing system 100 of the present embodiment accepts, via the user terminal 130, the designation of the image that causes the deterioration of quality of the virtual viewpoint image from the user who confirms each image displayed on the displaying unit. Then, the image processing system 100 prohibits the use of the image captured by the image capturing apparatus that captures the image designated by the user, in generation of a subsequent virtual viewpoint image. Thus, the image processing system 100 can avoid the deterioration of quality of the virtual viewpoint image.

Third Embodiment

Accordingly, as the capturing units respectively capturing the plurality of images used for the generation of the virtual viewpoint image become more distant from others, the virtual viewpoint image generated by using the images captured by the capturing units becomes as follows. That is, the image quality of this virtual viewpoint image is further deteriorated as compared with the image captured by a real image capturing apparatus from a relevant virtual viewpoint. For this reason, according as the capturing units capturing the respective images used for the generation of the virtual viewpoint image become more distant, the deterioration of quality of the generated virtual viewpoint image tends to occur easily. Therefore, in the present embodiment, the image processing system 100 determines a virtual viewpoint at which the deterioration of quality of the virtual viewpoint image tends to easily occur, based on the position of each of the image capturing apparatuses 110. Then, the image processing system performs a process by which the virtual viewpoint image from the determined virtual viewpoint and the display target image are displayed on the displaying unit.

The system configuration of the image processing system 100 of the present embodiment is the same as that of the first embodiment. Besides, the hardware constitution of each of the image capturing apparatus 110, the image generating apparatus 120, and the user terminal 130 of the present embodiment is the same as that of the first embodiment.

FIG. 8 is a diagram for describing an example of a functional configuration of the image generating apparatus 120 according to the present embodiment.

The image generating apparatus 120 of the present embodiment is different from that of FIG. 4 in that a distance obtaining unit 801 is included, instead of the user inputting unit 406.

Based on the real camera position information transferred from the real camera position managing unit 405, the distance obtaining unit 801 obtains each distance between the image capturing apparatuses included in the image capturing apparatuses 110, and each intermediate position between the image capturing apparatuses included in the image capturing apparatuses 110. The distance obtaining unit 801 selects the obtained distances one by one in descending order. Every time one distance is selected, the distance obtaining unit 801 transfers the information of the two image capturing apparatuses corresponding to the selected distance and the information of the intermediate position between these image capturing apparatuses to the virtual viewpoint managing unit 407. Then, the distance obtaining unit 801 instructs the virtual viewpoint managing unit 407 to update the virtual camera viewpoint information such that the intermediate position between these image capturing apparatuses is the position of the viewpoint of the virtual camera. Thus, the distance obtaining unit 801 can update the position of the virtual camera in the order that the deterioration of quality tends to occur.

With respect to the virtual camera, of which the position is updated, in the order that the deterioration of quality tends to occur, every time the position is updated, the image processing system 100 generates the virtual viewpoint image and displays the virtual viewpoint image and the display target image. Thus, the user can confirm a case when the virtual camera exists in a position where the deterioration of quality tends to occur, in advance of other cases.

Besides, the distance obtaining unit 801 may obtain the largest distance among the distances between the image capturing apparatuses included in the image capturing apparatuses 110, based on the real camera position information transferred from the real camera position managing unit 405. Besides, the distance obtaining unit 801 may identify which two image capturing apparatuses the obtained distance corresponds to the distance therebetween, and may obtain the intermediate position between the identified two image capturing apparatuses. The distance obtaining unit 801 obtains this position as a position of the virtual viewpoint where the deterioration of quality of the virtual viewpoint image most tends to occur. Then, the distance obtaining unit 801 may transfer information of the obtained position to the virtual viewpoint managing unit 407 to instruct operation to update the virtual camera viewpoint information based on the transferred information.

In this case, the image processing system 100 generates the virtual viewpoint image for the virtual camera that is disposed at the position where the deterioration of quality most tends to occur, and displays the generated virtual viewpoint image and the display target image. Thus, the user can monitor the deterioration of quality in the case when the deterioration of quality of the virtual viewpoint image tends to occur.

In response to such an instruction, the virtual viewpoint managing unit 407 updates the virtual camera viewpoint information stored in the HDD 304, or the like. Then, the virtual viewpoint managing unit 407 transfers, to the virtual viewpoint image generating unit 408, the updated virtual camera viewpoint information and the information indicating which two image capturing apparatuses the position of the updated virtual camera is the intermediate position therebetween, thereby instructing operation to generate the virtual viewpoint image. The virtual viewpoint image generating unit 408 identifies the two image capturing apparatuses, of which the intermediate position is the current position of the virtual camera, based on the transferred information indicating which two image capturing apparatuses the position of the updated virtual camera is the intermediate position therebetween. Then, the virtual viewpoint image generating unit 408 uses the images captured by the identified two image capturing apparatuses so as to have the highest contribution degree, thereby generating the virtual viewpoint image.

FIG. 9 is a flowchart for describing an example of a process to be performed by the image generating apparatus 120 according to the present embodiment. In the process of FIG. 9, only differences from the process of FIG. 5 will be described. The processes of steps S502 to S508 of FIG. 9 are the same as the processes of steps S502 to S508 of FIG. 5.

In step S901, the distance obtaining unit 801 requests the real camera position information to the real camera position managing unit 405, and obtains the real camera position information transferred from the real camera position managing unit 405 in response to the request.

In step S902, the distance obtaining unit 801 obtains each distance between the image capturing apparatuses included in the image capturing apparatuses 110 based on the real camera position information obtained in step S901, and obtains each intermediate position between the image capturing apparatuses included in the image capturing apparatuses 110.

In step S903, the distance obtaining unit 801 selects one by one the distance obtained in step S902 from the largest one. In the following, the distance selected by the distance obtaining unit is referred to as a selected distance. Every time the selected distance is selected, the distance obtaining unit 801 transfers the information of the two image capturing apparatuses corresponding to the selected distance and the information of the intermediate position between these two image capturing apparatuses to the virtual viewpoint managing unit 407, and controls operation to repeat the processes of step S904, and steps S502 to S508.

In step S904, the virtual viewpoint managing unit 407 updates the virtual camera viewpoint information based on the information of the intermediate position between the two image capturing apparatuses transferred in step S903. The virtual viewpoint managing unit 407 transfers the information of these two image capturing apparatuses to the virtual viewpoint image generating unit 408. The virtual viewpoint image generating unit 408 generates the virtual viewpoint image by using the image captured by the image capturing apparatus indicated by the transferred information.

Figure 10:
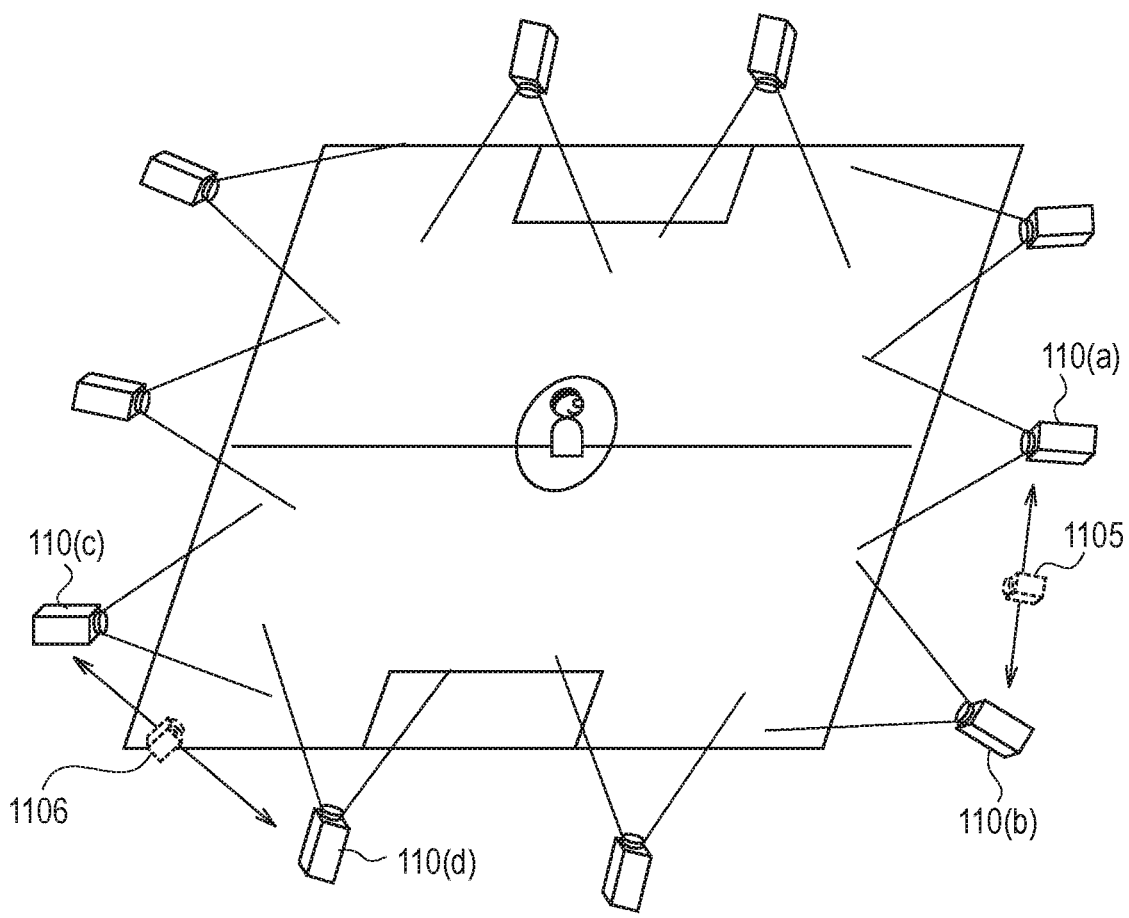
FIG. 10 is a diagram for describing an example of a state that the image capturing apparatuses are disposed.

FIG. 10 is a diagram for describing an example of a state that the image capturing apparatuses 110 of the present embodiment are disposed. A positional relationship among the respective image capturing apparatuses 110 and the virtual camera in the present embodiment will be described with reference to FIG. 10. The image pickup apparatuses 110 are disposed so as to surround the center of a stadium, which is a target to be captured.

In the example of FIG. 10, it is assumed that the largest distance between the image capturing apparatuses included in the image capturing apparatuses 110 is the distance between an image capturing apparatus 110(a) and an image capturing apparatus 110(*b*). Here, a virtual camera 1105 is the virtual camera disposed at the intermediate position between the image capturing apparatus 110(*a*) and the image capturing apparatus 110(*b*).

Besides, it is assumed that the second largest distance among the image capturing apparatuses included in the image capturing apparatuses 110 is the distance between an image capturing apparatus 110(*c*) and an image capturing apparatus 110(*d*). Here, a virtual camera 1106 is the virtual camera disposed at the intermediate position between the image capturing apparatus 110(*c*) and the image capturing apparatus 110(*d*).

FIGS. 11A and 11B are diagrams for describing examples of display states of display images in the present embodiment. FIG. 11A is the diagram of an example of a state that a display image including a virtual viewpoint image that can be regarded as being captured by the virtual camera 1105 is displayed. An image 1101 is the virtual viewpoint image. Images 1102 to 1107 are the display target images. The images 1102 and 1103 are images respectively captured by the image capturing apparatuses 110(*b*) and 110(*a*) having the largest contribution degree.

FIG. 11B is the diagram of an example of a state that a display image including a virtual viewpoint image that can be regarded as being captured by the virtual camera 1106 is displayed. An image 1111 is the virtual viewpoint image. Images 1112 to 1117 are the display target images. The images 1112 and 1113 are images respectively captured by the image capturing apparatuses 110(*c*) and 110(*d*) having the largest contribution degree.

In the present embodiment, the image processing system 100 updates the virtual camera viewpoint information, and, every time the virtual viewpoint image is regenerated, displays the regenerated virtual viewpoint image and the corresponding display target image on the displaying unit of the user terminal 130. However, the image processing system 100 may update the virtual camera viewpoint information, and, every time the virtual viewpoint image is regenerated, may display only the regenerated virtual viewpoint image. Besides, every time the virtual camera viewpoint information is updated, the image processing system 100 may display, in a lump, the plurality of regenerated virtual viewpoint images on the displaying unit of the user terminal 130.

As described above, in the present embodiment, the image processing system 100 generates the virtual viewpoint image and displays the virtual viewpoint image and the display target image, while updating the disposed positions of the virtual camera in order from the position where the deterioration of quality of the virtual viewpoint image tends to occur. In the case when the virtual camera is disposed at the intermediate position between the two capturing units, as the distance between these two capturing units is larger, the quality of the virtual viewpoint image generated by using the images captured by these two capturing units tends to deteriorate. According to the process of the present embodiment, the user can monitor the quality of the virtual viewpoint image with respect to the case when the deterioration of quality tends to occur, in advance of other cases. That is, the user can more efficiently monitor the quality of the virtual viewpoint image.

Other Embodiments

The present invention can also be realized by a process in which a program for realizing one or more functions of the above embodiments is supplied to a system or an apparatus via a network or a storage medium and one or more processors in the system or the apparatus read and execute the supplied program. Besides, the present invention can also be realized by a circuit (e.g., an ASIC) of realizing one or more functions of the above embodiments.

For example, a part or whole of the functional configuration of the above image processing system 100 may be implemented in the image generating apparatus 120 as hardware.

Although the example of the embodiments of the present invention has been described in detail above, the present invention is not limited to the specific embodiments. Any of the above embodiments may be combined arbitrarily, or those modified and replaced appropriately, or other configurations may be used.

Embodiment(s) of the present invention can also be realized by a computer of a system or an apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus comprising:
one or more memories storing instructions; and
one or more processors executing the instructions:
to determine, among a plurality of captured images obtained by a plurality of cameras, a display target image related to a virtual viewpoint image, based on a position of a virtual viewpoint and a view direction from the virtual viewpoint, the virtual viewpoint image being generated based on the display target image and the position of the virtual viewpoint and the view direction from the virtual viewpoint; and
to cause a displaying unit to display the determined display target image in a displaying mode according to a degree of contribution of the determined display target image to generation of the virtual viewpoint image.

2. The information processing apparatus according to claim 1, wherein an image contributing to determination of a three-dimensional shape of an object included in the virtual viewpoint image is determined to be the display target image, the virtual viewpoint image being generated based on the determination of the three-dimensional shape of the object.

3. The information processing apparatus according to claim 1, wherein an image contributing to determination of a color of an object included in the virtual viewpoint image is determined to be the display target image, the virtual viewpoint image being generated based on the determination of the color of the object.

4. The information processing apparatus according to claim 1, wherein the display target image is displayed in a displaying mode according to a positional relationship between the virtual viewpoint and a camera obtaining the determined display target image.

5. The information processing apparatus according to claim 4, wherein the display target image is displayed in the displaying mode based on which direction a camera obtaining the determined display target image is located with respect to the virtual viewpoint.

6. The information processing apparatus according to claim 4, wherein the display target image is displayed in the displaying mode according to how far a camera obtaining the determined display target image is located from the virtual viewpoint.

7. The information processing apparatus according to claim 6, wherein, in a case when, among cameras respectively obtaining a plurality of determined display target images, a first camera is located farther from the virtual viewpoint than a second camera, a captured image obtained by the first camera being smaller than a captured image obtained by the second camera.

8. The information processing apparatus according to claim 1, wherein the virtual viewpoint image, the display target image, and the attribute information of a camera obtaining the display target image are displayed.

9. The information processing apparatus according to claim 1, wherein at least two captured images are determined, as the display target images, from among the plurality of captured images obtained by the plurality of cameras, based on a distance between cameras among the plurality of cameras.

10. The information processing apparatus according to claim 9, wherein captured images respectively obtained by two cameras having a greatest distance among the plurality of cameras.

11. The information processing apparatus according to claim 9, wherein a virtual viewpoint image being based on an intermediate position between cameras respectively obtaining the at least the two captured images is further displayed.

12. The information processing apparatus according to claim 1, wherein the one or more processors further execute the instructions:
  to accept a user operation for designating one or more images among a plurality of determined display target images; and
  to control operation, not to use, in the generation of the virtual viewpoint image, the image designated by the accepted user operation.

13. An information processing method that is performed by an information processing apparatus, the information processing method comprising:
  determining, among a plurality of captured images obtained by a plurality of cameras, a display target image related to a virtual viewpoint image, based on a position of a virtual viewpoint and a view direction from the virtual viewpoint, the virtual viewpoint image being generated based on the display target image and the position of the virtual viewpoint and the view direction from the virtual viewpoint; and
  causing a displaying unit to display the determined display target image in a displaying mode according to a degree of contribution of the determined display target image to generation of the virtual viewpoint image.

14. A non-transitory computer-readable storing unit that stores a program for causing a computer to function as each of following units of an information processing apparatus:
  a determining unit configured to determine, among a plurality of captured images obtained by a plurality of cameras, a display target image related to a virtual viewpoint image, based on a position of a virtual viewpoint and a view direction from the virtual viewpoint, the virtual viewpoint image being generated based on the display target image and the position of the virtual viewpoint and the view direction from the virtual viewpoint; and
  a display controlling unit configured to cause a displaying unit to display the determined display target image in a displaying mode according to a degree of contribution of the determined display target image to generation of the virtual viewpoint image.

* * * * *